United States Patent
Ito et al.

(10) Patent No.: US 7,400,344 B2
(45) Date of Patent: Jul. 15, 2008

(54) OBJECT TRACKING METHOD AND OBJECT TRACKING APPARATUS

(75) Inventors: Wataru Ito, Kodaira (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 469 days.

(21) Appl. No.: 10/736,589

(22) Filed: Dec. 17, 2003

(65) Prior Publication Data

US 2004/0125984 A1    Jul. 1, 2004

(30) Foreign Application Priority Data

Dec. 19, 2002    (JP)    ............................. 2002-367852

(51) Int. Cl.
*H04N 7/18*    (2006.01)
(52) U.S. Cl. ...................................... 348/169; 348/171
(58) Field of Classification Search .......... 348/142–170
See application file for complete search history.

(56) References Cited

U.S. PATENT DOCUMENTS

| 5,091,780 A * | 2/1992 | Pomerleau ................. 348/152 |
| 5,554,983 A | 9/1996 | Kitamura et al. |
| 5,757,287 A | 5/1998 | Kitamura et al. ............ 340/937 |
| 6,028,626 A * | 2/2000 | Aviv ........................... 348/152 |
| 6,075,557 A | 6/2000 | Holliman et al. ............... 348/51 |
| 6,731,799 B1 * | 5/2004 | Sun et al. ..................... 382/173 |
| 6,950,123 B2 * | 9/2005 | Martins ....................... 348/157 |

FOREIGN PATENT DOCUMENTS

| JP | 63246689 | 10/1988 |
| JP | 440599 | 2/1992 |
| JP | 6231252 | 8/1994 |
| JP | 1013821 | 1/1998 |
| JP | 10318732 | 12/1998 |

OTHER PUBLICATIONS

H. Tamura, "Introduction to Computer Image Processing", Soken Publishing Co., pp. 118-125 and 149-153, 1985.
"Digital Picture Processing" published by Academic Press pp. 296-303, 1976.
U.S. Appl. No. 09/592,996, filed Jun. 13, 2000.

* cited by examiner

*Primary Examiner*—Andy S Rao
(74) *Attorney, Agent, or Firm*—Mattingly, Stanger, Malur & Brundidge, P.C.

(57) ABSTRACT

An object tracking method and an object tracking apparatus. Based on two or more frames of images acquired at different time points from an imaging unit, an image changing area is detected between the frames. Based on the image changing area thus detected, the position of an object is detected. The detected position of the object is set as a new detected position of the object in place of the present detected position of the object, thereby detecting and tracking an object intruding into a monitor area.

14 Claims, 14 Drawing Sheets

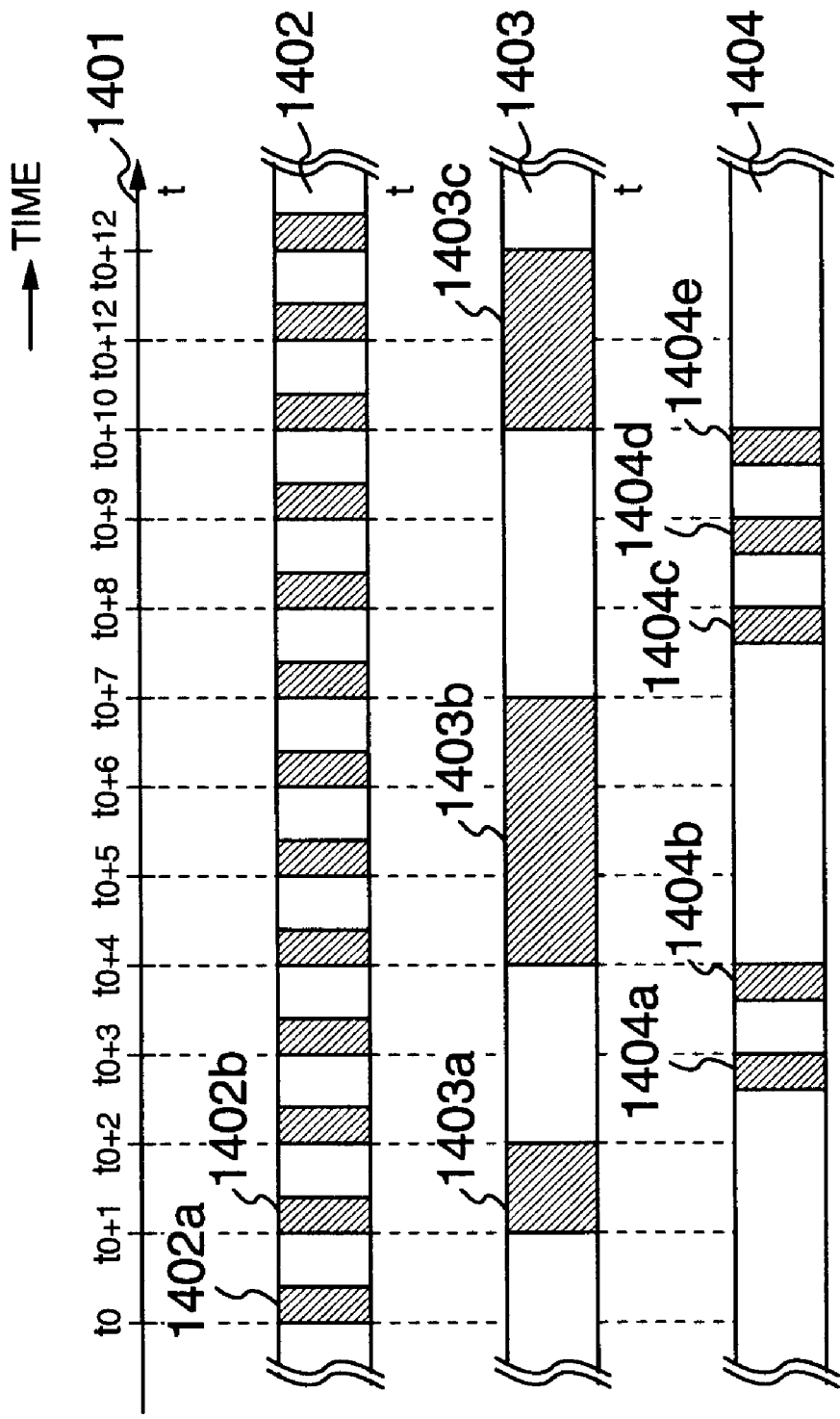

OBJECT TRACKING METHOD AND OBJECT TRACKING APPARATUS

CROSS-REFERENCE TO RELATED APPLICATION

The present invention is related to U.S. patent application Ser. No. 09/592,996 filed Jun. 13, 2000, now U.S. Pat. No. 6,687,386, entitled "OBJECT TRACKING METHOD AND OBJECT TRACKING APPARATUS", the entire content of which is incorporated herein by reference for all purposes.

BACKGROUND OF THE INVENTION

The present invention relates to an object tracking system using an imaging unit, or in particular to an object tracking method and an object tracking apparatus for automatically detecting an object within a monitor area by processing an image signal and tracking the object by controlling the universal head of the camera carrying the imaging unit.

An object tracking system such as a remote monitor system using an imaging unit (hereinafter referred to as "the camera") such as a TV camera has been widely used. Many of them are what is called a manned monitor system which is operated by a monitor person watching the image displayed on the monitor. In the manned monitor system, however, a monitor person is required to keep watching the image displayed on the monitor and identify in real time an object such as a man or an automotive vehicle which may intrude into the monitor area. This is a great burden on the monitor person.

The concentration power of the man is limited. In the manned monitor system, therefore, an intruding object may be unavoidably overlooked, thereby posing the problem of low reliability. Also, in the case where an intruding object is found in the image (camera image) picked up by the camera, the camera universal head (electrically operated swivel base) carrying the camera is required to be operated in such a manner as to catch the intruding object within the camera view filed (i.e. the imaging view field). Partly due to the recent explosive extension of ownership of the monitor camera, however, one monitor person often watches a multiplicity of camera images on a plurality of monitors. In the case where a plurality of cameras catch an intruding object at the same point time, the universal heads of the plurality of the cameras cannot be easily operated at the same time. In such a case, the intruding object is liable to be overlooked.

Demand is high, therefore, for what is called a monitor system of automatic detection and tracking type in which an intruding object is detected not by a monitor person but automatically by processing the image picked up by the camera (camera image), and controlling the universal head of the camera to catch the intruding object in the camera view field as required thereby to make a predetermined announcement or alarm.

As a function to realize the monitor system described above, the camera universal head is required to be controlled in such a manner that an object to be monitored and considered an intruding object is detected from an image signal by a predetermined monitor method and caught within the camera view field.

In the conventionally implemented monitor system of this type, an intruding object in the view field is detected by the difference method. In the difference method, an image (input image) picked up by the imaging unit such as a camera is compared with an image containing no image of the object to be detected (i.e. a reference background image prepared in advance), the difference of the brightness value is determined for each pixel or each pixel block including a plurality of pixels, and an area having a large difference (image signal change area) is detected as an intruding object.

The image of the intruding object detected in this way is registered as a template, and the motion of the intruding object within the camera view field is detected thereby to control the camera universal head in accordance with the motion of the object.

The process for this conventional method of detecting an intruding object is explained with reference to the flowchart of FIG. 5. In FIG. 5, the process starts with the initialization step 101 in which external devices, variables and an image memory for executing the intruding object tracking method are initialized. Next, in step 102 defined by dotted line, an intruding object is detected by the difference method. Step 102 includes a first image input step 102a for acquiring an input image having 320 row pixels and 240 column pixels, for example, from the camera. Next, in the difference processing step 102b, the brightness value difference for each pixel between the input image acquired in the first image input step 102a and the reference background image prepared in advance is calculated as a brightness value of the difference image. Then, in the binarization step 102c, a binary image is acquired from the pixel value of the difference image (difference value) obtained in the difference processing step 102b in such a manner that the value of each pixel less than a predetermined threshold value Th (say, 20) is regarded as "0" and the pixel value not less than the threshold value Th as "255" (calculated with each pixel as 8 bits in pixel value). Next, in the labeling step 102d, a cluster of pixels having the value "255" is detected in the binary image obtained in the binarization step 102c, and each pixel is discriminated by a number attached thereto. In the intruding object presence determining step 102e, it is determined that an intruding object exists in the monitor area in the case where the cluster of the pixels having the value "255" numbered in the labeling step 102d meets predetermined conditions (for example, a size having 20 row pixels and 50 column pixels) as described above with reference to the difference method.

In the case where it is determined that an intruding object exists in the intruding object determining step 102e, the process branches to the first alarm/alarm display step 103. In the case where it is determined that there is no intruding object, on the other hand, the process branches to the first image input step 102a again thereby to execute the difference method.

Next, in the first alarm/alarm display step 103, the monitor person is informed, for example, by sounding an alarm indicating that an intruding object has been found or displaying an alarm indicating that an intruding object has been found on the monitor. Then, in the template registration step 104, an image of the intruding object is cut out from the input image based on the cluster of the pixels having the pixel value "255" numbered in the labeling step 102d, and registered as a template.

Next, the position is detected where the degree of coincidence (likeliness) becomes maximum between an image sequentially input and the template thereby to detect the position of the intruding object. This method is widely known as the template matching, and is described in detail, for example, in "Digital Picture Processing" published by ACADEMIC PRESS pp. 296-303, 1976 and U.S. Pat. No. 5,554,983, the disclosure of which is hereby incorporated by reference herein.

The template matching is used by reason of the fact that the execution of the difference method requires the reference background image 602, and in the case where the camera universal head is controlled in such a manner as to catch an intruding object within the camera view field, the optical axis of the camera deviates undesirably, thereby making it impossible to use the reference background image 602 prepared in advance.

Normally, in the case where the position of an intruding object is detected using the template matching, the position change of the intruding object is followed in such a manner that the image at the position of the intruding object detected by template matching is sequentially updated as a new template. This process is executed in and subsequent to the second image input step 105, and explained below.

In the second image input step 105, like in the first image input step 102a, an input image having 320 row pixels and 240 column pixels, for example, is acquired from the camera. Next, in the template matching step 106, an image having the highest degree of coincidence with the template is detected from the input image acquired in the second image input step 105. Normally, the job of comparing the whole input image with the template requires a long calculation time. Therefore, a predetermined range with respect to the template (for example, a range extended 20 column pixels and 50 row pixels with respect to the template) is set as a search area, and an image highest in the degree of coincidence with the template is detected within this search area.

The degree of coincidence can be calculated using the normalized cross-correlation value $r(\Delta x, \Delta y)$ described in U.S. patent Ser. No. 09/592,996.

The normalized cross-correlation value $r(\Delta x, \Delta y)$ is included in the range $-1 \leq r(\Delta x, \Delta y) \leq 1$, and in the case where the input image and the template coincide completely with each other, the value of "1" is assumed. The template matching is a process in which $\Delta x$ and $\Delta y$ are scanned within the search range, that is to say, changed in the range $-50 \leq \Delta x \leq 50$ and $-20 \leq \Delta y \leq 20$, respectively, thereby to detect the position associated with the maximum normalized cross-correlation value $r(\Delta x, \Delta y)$.

Next, in the coincidence degree determining step 107, the degree of coincidence $r(\Delta x, \Delta y)$ is determined. In the case where the normalized cross-correlation value is used, and not less than 0.7, for example, it is determined that the degree of coincidence is high, and the process branches to the intruding object position correcting step 108. In the case where the normalized cross-correlation value is less than 0.7, on the other hand, it is determined that the degree of coincidence is low, and the process branches to the first image input step 102a.

A high degree of coincidence is indicative of the presence of an image similar to the template in the input image, i.e. the presence of an intruding object in the input image. In this case, the intruding object continues to be tracked.

A low degree of coincidence, on the other hand, indicates the absence of an image similar to the template in the input image, i.e. the absence of an intruding object in the input image. In this case, the process branches to the first input image input step 102a, and the process for detecting an intruding object is executed again by the difference method.

In the intruding object position correcting step 108 executed in the case where the degree of coincidence is high, the value $(x0+\Delta x, y0+\Delta y)$ is corrected as a new position of the intruding object based on the position $(\Delta x, \Delta y)$ associated with the maximum degree of coincidence. Next, in the template update step 117, the input image obtained in the second image input step 105 is cut out as a new template image based on the newly determined position of the intruding object.

Further, in the camera universal head control step 118, the camera universal head (i.e. the direction of the optical axis of the camera) is controlled according to the displacement between the position of the intruding object detected in the template matching step 106 and a predetermined reference position of the input image (i.e. a predetermined reference position in the imaging view field) such as the center of the input image. As an example, assume that an intruding object is detected at a position 802 shown in FIG. 6. Assuming that the center position of the intruding object coincides with the center 803 of the template, the displacement dx, dy from the center of the image is calculated.

In the case where the template center position 803 is located leftward of the center 804 of the input image by at least a predetermined amount s (dx<−s), the camera universal head is panned leftward. In the case where the template center position 803 is located rightward of the center 804 of the input image by at least a predetermined amount s (dx>s), on the other hand, the camera universal head is panned rightward. In the case where the intruding object is located at about the center of the image ($-s \leq dx \leq s$), the camera universal head is not required to be controlled. Therefore, the position where the camera universal head begins to be controlled can be designated by the predetermined amount s. The predetermined amount s is 50, for example.

Also, in the case where the center position 803 of the template is higher than the center 804 of the input image (dy<−s), the camera universal head is tilted upward, while in the case where the center position 803 of the template is lower than the center 804 of the input image (dy>s), the camera universal head is tilted downward.

As an alternative, the control speed of the pan motor and the tilt motor may be changed according to the absolute value of dx and dy (the control speed is higher, the larger the absolute value of dx or dy).

Finally, in the second alarm/alarm display step 119, an alarm is sounded, for example, to inform the monitor person that an intruding object is being tracked. Alternatively, an alarm indicating that an intruding object is being tracked may be displayed on the monitor.

The method of tracking an intruding object using the template matching described above poses the problem that in the case where the direction of the intruding object to be tracked changes (in the case where the intruding person turns his head to the right or looks back, for example), the displacement between the intruding object and the position detected by the template matching is increased and the accurate and stable tracking becomes impossible.

This is due to the characteristic of the template matching in which a pattern having a high contrast in the template (the part of a large brightness value difference) is matched. Assume that an intruding object is an automotive vehicle which is first directed forward and substantially wholly held in the template. Once the vehicle changes its running direction sideways, for example, other parts than the front part of the vehicle can no longer be held in the template. Unlike during the time when the whole vehicle is held in the template, the center of the template moves to the front part from the center of the vehicle, and therefore the detection position of the intruding object is displaced.

This phenomenon is explained with reference to FIG. 7. In order to simplify the explanation, this figure shows an example where the camera universal head is not controlled. To explain the phenomenon in which an intruding object becomes impossible to hold in the template by the template matching method of tracking the intruding object, the process executed in the case where a vehicle running along a curved road in the imaging view field is tracked as an intruding object is shown in FIG. 7.

Reference numerals 901, 903, 905 and 907 designate template images at time points $t_1-1$, $t_1$, $t_1+1$ and $t_1+2$, respectively, and numerals 901a, 903a, 905a and 907a the template at time points $t_1-1$, $t_1$, $t_1+1$ and $t_1+2$, respectively. Numerals 902, 904, 906 and 908 designate input images at time points $t_1$, $t_1+1$, $t_1+2$ and $t_1+3$, respectively, and numerals 902a, 904a, 906a and 908a the template positions at time points $t_1-1$, $t_1$, $t_1+1$ and $t_1+2$, respectively (the positions of the intruding object at time points $t_1-1$, $t_1$, $t_1+1$ and $t_1+2$, respectively). Also, numerals 902b, 904b, 906b and 908b designate the positions of the intruding object detected by template matching at time points $t_1$, $t_1+1$, $t_1+2$ and $t_1+3$, respectively.

SUMMARY OF THE INVENTION

In FIG. 7, the template 901a registered at time point $t_1-1$ is an image in which the vehicle the front portion of the vehicle is directed substantially forward. At time point $t_1$, the template matching is conducted using the template 901a (the template matching step 709) thereby to detect the position to which the intruding object has moved, while at the same point time updating the template 901a to the template 903a (the template update step 710).

Then, the template is updated to the template 905a at time point $t_1+1$ and to the template 907a at time point $t_1+2$. After this process is repeated up to time point $t_1+3$, the template, that held the front portion of the vehicle with the head lights when the tracking started at time point $t_1-1$, now holds the left side of the vehicle at time point $t_1+3$. This phenomenon is caused by the fact that the matching is conducted in such a manner as to reduce the displacement between the input image handled by template matching and the high-contrast portion of the template image, i.e. the head lights of the vehicle in this case. As a result, as shown in FIG. 7, the template is displaced leftward when the intruding object turns from right to left, and rightward when it turns from left to right.

Further, although the template 901a which held only the image of the vehicle at time point $t_1-1$, the template 908b at time point $t_1+3$ contains a background image other than the intruding object to be tracked as the result of displacement with respect to the intruding object. In the case where the template matching process is continued using the template 908b containing many images other than the intruding object to be tracked, the intruding object cannot be caught but the background portion contained in the template is matched. Thus, the method of tracking an intruding object using the template matching has the disadvantage that in the case where the intruding object changes its direction, the pattern of the intruding object apparently moves and displaces the template position from the position of the intruding object. As a result, the accurate tracking of the intruding object to be tracked cannot be guaranteed and the steady tracking of the intruding object becomes impossible.

As described above, the prior art has the disadvantage that steady tracking becomes impossible in the case where an intruding object changes its direction considerably.

An object of this invention is to provide an object tracking method and an object tracking apparatus free of the disadvantages of the prior art.

Another object of the invention is to provide an object tracking method and an object tracking apparatus which operates reliably and stably to detect and track an intruding object accurately even in the case where the intruding object changes its direction considerably.

In order to achieve the objects described above, according to one aspect of the invention, there is provided an object tracking method for detecting and tracking an object in a picked-up image based on an image signal acquired by an imaging unit, including the steps of:

detecting an image change area between at least two frames of images picked up at different time points by the imaging unit; and correcting the object position by detecting the position of the object based on the detected image change area and setting the detected object position as a new detected object position in place of the present detected object position.

In an example of this aspect of the invention, the image change area detection step is to detect a change area of the image signal by comparing the two frames of image signals picked up at different time points by the imaging unit while the camera universal head (imaging unit controller) is stationary. In another example of this aspect of the invention, the object position correcting step is to enlarge the intended area in steps for accurate position detection of an intruding object based on the intruding object position information and to correct the intruding object position information by detecting the change area of the image signal obtained in the image signal change area detection step and the accurate position of the intruding object based on the intended area.

In order to achieve the objects of the invention, according to another aspect of the invention, there is provided an object tracking apparatus for detecting and tracking an object in a picked-up image based on an image signal acquired by an imaging unit, including:

an image input unit for converting the video signals acquired by the imaging unit sequentially into image signals; and a processing unit for processing the image signals converted by the image input unit, in a predetermined sequence;

wherein the processing unit detects an image change area between at least two frames of images acquired at different time points from the imaging unit, and by detecting the position of the intruding object based on the detected image change area, sets the detected object position as a new detected object position in place of the present detected object position.

According to this invention, the employment of the interframe difference processing step obviates the problems of the prior art in which the template may be displaced with respect to an intruding object and come to contain many images other than the intruding object in the case where the intruding object changes its direction, with the result that the template matches with the background contained therein and the image of the intruding object cannot be caught. Further, even an intruding object considerably changing its direction can be detected and tracked accurately.

Other objects, features and advantages of the invention will become apparent from the following description of the embodiments of the invention taken in conjunction with the accompanying drawings.

BRIEF DESCRIPTION OF THE DRAWINGS

FIGS. 13A to 13C are timing charts showing the operations of a template matching processing, a camera universal head control processing and an intruding object position correcting processing using an inter-frame difference processing, according to the invention.

DETAILED DESCRIPTION OF THE INVENTION

An object tracking method and an object tracking apparatus according to embodiments of this invention are explained in detail below with reference to the accompanying drawings.

Figure 4:
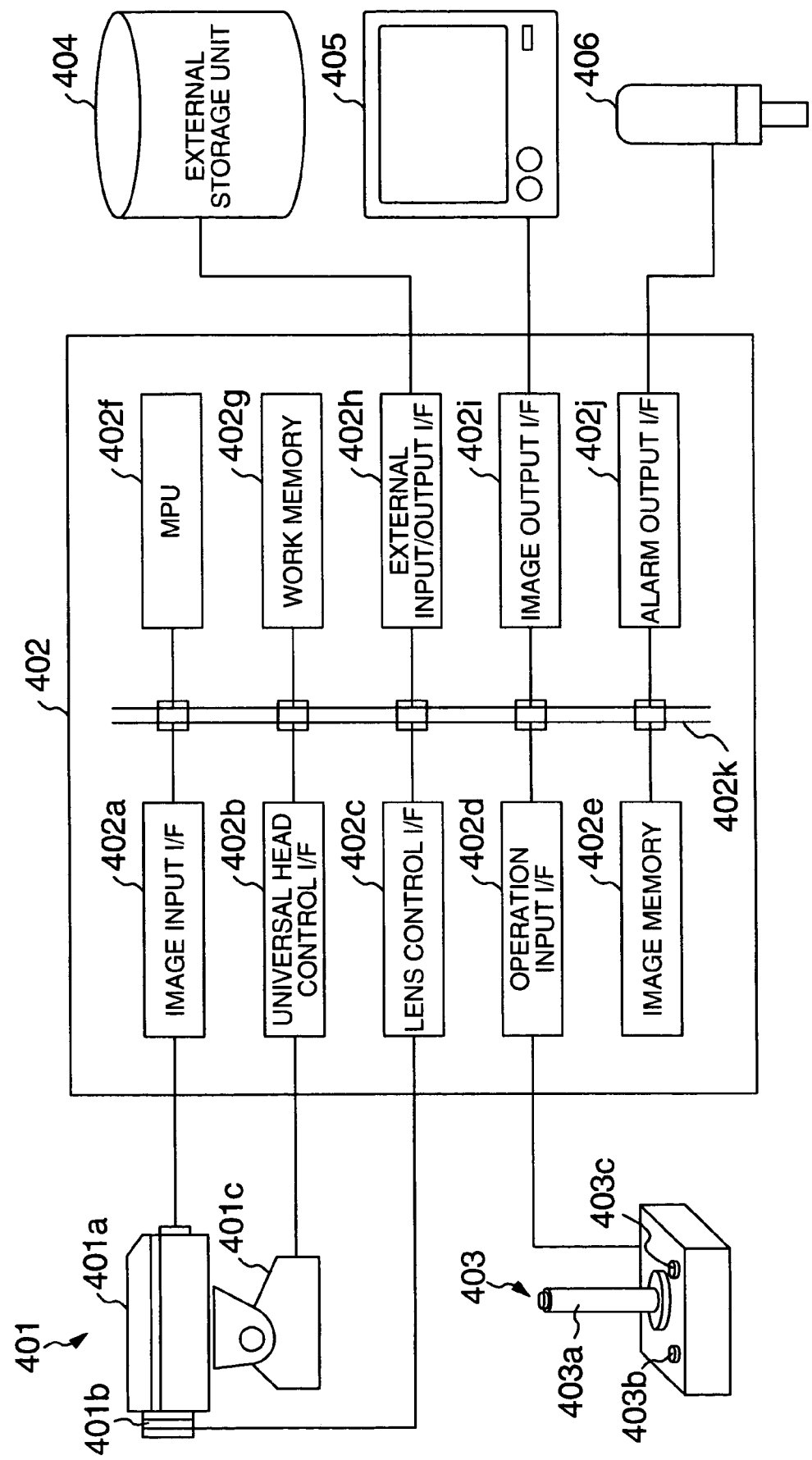
FIG. 4 is a diagram showing an example of the configuration of a monitor system embodying the invention.

First, FIG. 4 shows an example of the hardware configuration of a monitor system according to an embodiment of the invention. Reference numeral 401 designates an imaging unit including at least a camera 401a, a zoom lens 401b and a universal head (electrically-operated swivel base) 401c. Numeral 402 designates a processing unit including an image input unit (image input I/F) 402a, a universal head control unit (universal head input I/F) 402b, a lens control unit (lens control I/F) 402c, an operation input unit (operation input I/F) 402d, an image memory 402e, a MPU (microprocessing unit) 402f, a work memory 402g, an external input/output unit (external input/output I/F) 402h, an image output unit (image output I/F) 402i, an alarm output unit (alarm output I/F) 402j and a data bus 402k. These component parts are combined with an operating unit 403, an external storage unit 404, an image monitor 405 and an alarm lamp 406.

The operating unit 403 includes a joystick 403a, a first button 403b and a second button 404c. The output terminal of the camera 401a is connected to the data bus 402k through the image input unit 402a. The control unit of the zoom lens 401b is connected to the data bus 402k through the lens control unit 402c. The universal head on which the camera 401a is mounted is connected to the data bus 402k through the universal head control unit 402b. The output terminal of the operating unit 403 is connected to the data bus 402k through the operation input unit 402d.

The external storage unit 404 is connected to the data bus 402k through the external input/output unit 402h. The image monitor 405 is connected to the data bus 402k through the image output unit 402i. The alarm lamp 406 is connected to the data bus 402k through the alarm output unit 402j. The MPU 402f and the work memory 402g are connected directly to the data bus 402k.

The camera 401a catches the monitor area within a predetermined view field and by picking up an image of the monitor area, outputs a video signal. For this purpose, the camera 401a has a zoom lens 401b and is mounted on the universal head 401c. The video signal picked up is stored in the image memory 402e from the image input unit 402a through the data bus 402k. The external storage unit 404 functions to store the programs and data, which are read into the work memory 402g through the external input/output unit 402h on the one hand and held in the image storage unit 404 on the other hand, as required.

The MPU 402f executes the process according to the program held in the external storage unit 404 and read into the work memory 402g when the processing unit 402 is in operation, and analyzes the images stored in the image memory 402e in the work memory 402g. In accordance with the result of this processing, the MPU 402f controls the zoom lens 401b and the universal head 401c thereby to change the imaging view field of the camera 401a. At the same time, MPU 402f displays an image of the result of detection of an intruding object on the monitor 405 and turns on the alarm lamp 406 as required.

Figure 2:
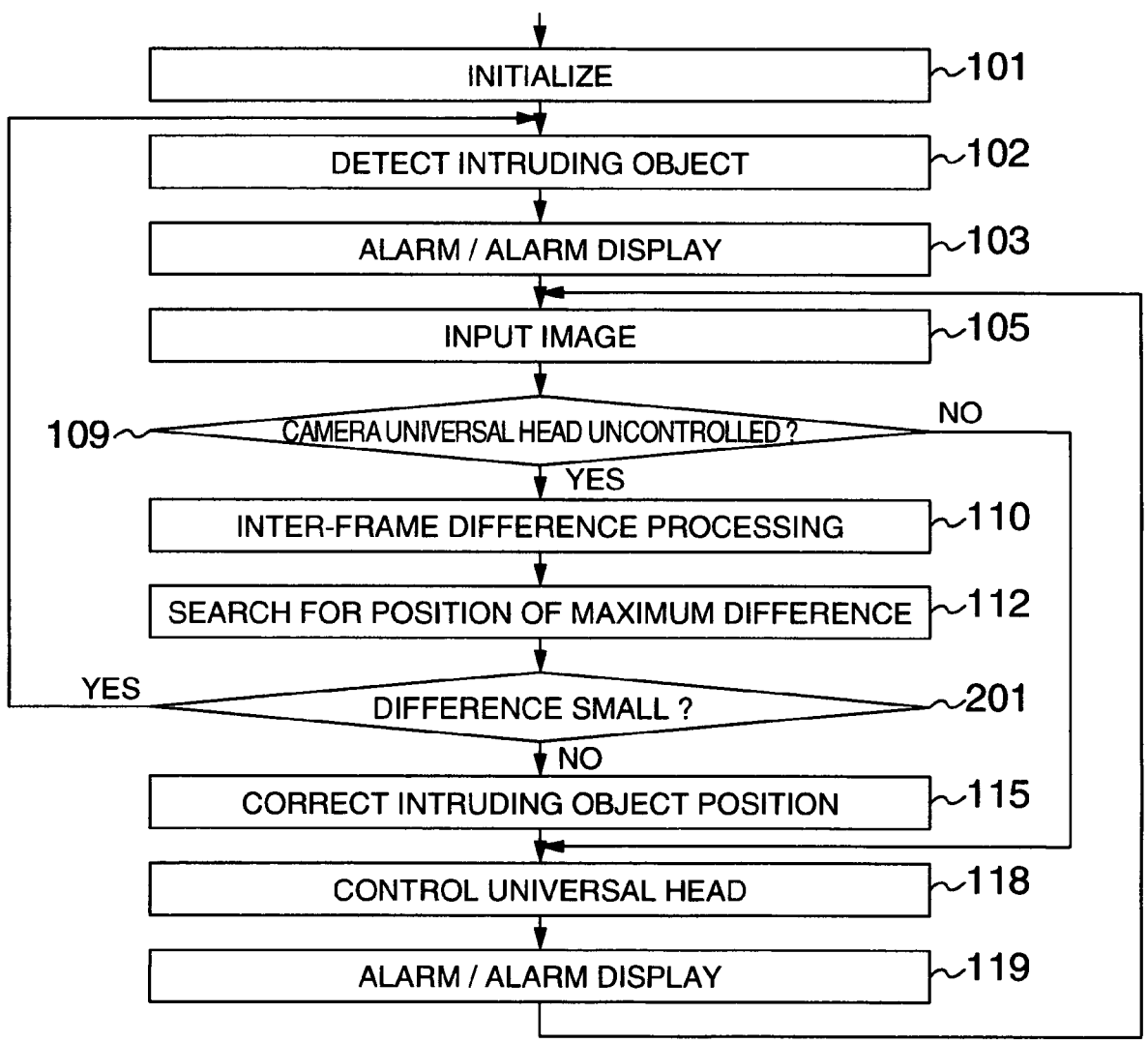
FIG. 2 is a flowchart for explaining an example of the processing flow according to a first embodiment of the invention.

Next, an example of the operation according to an embodiment of the invention is explained. The embodiments explained hereinafter are operated with the hardware configuration shown in FIG. 4. First, the operation of the first embodiment of the invention is explained with reference to FIG. 2. FIG. 2 is a flowchart showing an example of the processing according to the first embodiment of the invention.

The process shown in FIG. 2 starts with the initialization step 101. In the initialization step 101, the image memory area and the recording area are initialized. Also, the reference background image recorded in the external storage unit 404 is read and stored in the image memory 402e.

The image memory area is used to execute the process of tracking an intruding object, and secured in the image memory 402e. The recording area, on the other hand, is an area secured in the work memory 402g to store the variables, etc. required for executing the process.

In the intruding object detection processing step 102, the same process is executed as in the intruding object detection processing step according to the prior art described above with reference to FIG. 5. In FIG. 2, the respective steps making up the intruding object detection processing step 102 are indicated as a single step. The operation of each step is similar to the processing operation of the corresponding step in the prior art described above and therefore is not described again.

In the first alarm/alarm display step 103, an image of an intruding object detected is displayed on the image monitor 405, for example, and the alarm lamp 406 is turned on to announce that an intruding object exists in the monitor area.

In the image input step 105, the image signal picked up by the camera 401a is input through the image input unit 402a thereby to acquire an input image having 320 row pixels and 240 column pixels, for example, with eight data bits per pixel (320×240 pixels, 8 bits/pixel). In the process, the input image acquired in the preceding processing frame (in the step one session before) is stored in the image memory 402e. The input image stored in the image memory 402e is erased upon the lapse of a predetermined length of time (say, ten seconds) after the input time.

In the camera universal head stop determining step 109, it is determined whether the universal head 401c is out of operation, i.e. whether the imaging direction (that is to say, the direction of the optical axis) of the camera are fixed or not. In the case where the universal head 401 is out of operation, the process branches to the inter-frame difference processing step 110. Otherwise, the process branches to the universal head control step 118 (for the reason described later).

Figure 6:
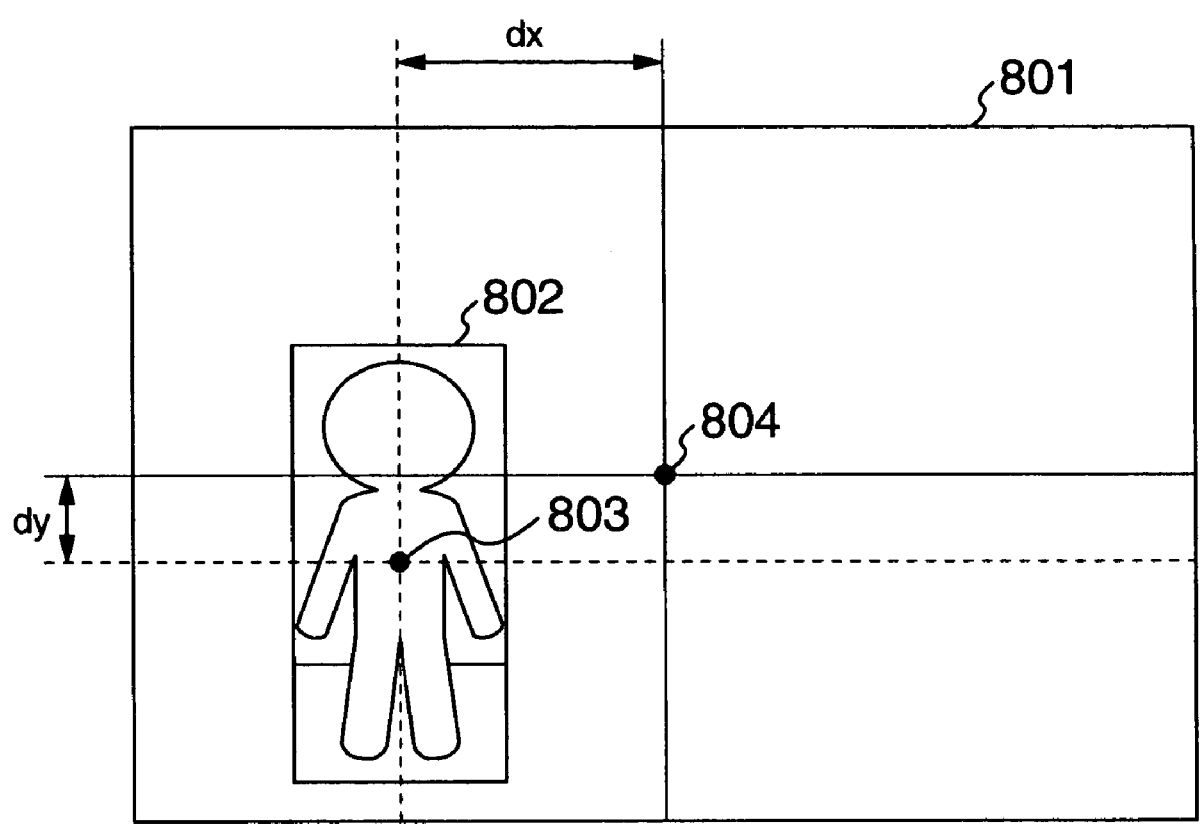
FIG. 6 is a diagram for explaining a method of controlling the universal head of the camera.

In the inter-frame difference processing step 110, the processing of the inter-frame difference method is executed. According to the inter-frame difference method, the input image of the preceding processing frame stored in the image memory 402e is used in place of the reference background image 602 in the conventional difference method for detecting an intruding object described in FIG. 6. Specifically, in the case where two frames of input images obtained at different time points are used by the difference method, the portion moving in the input image (the portion with the pixel value undergoing a change) is detected. Since the intruding object is in motion, the pixel values of the intruding object develop a difference thereby making it possible to detect the intruding object. This difference method is specifically called the inter-frame difference method and widely used. Incidentally, the method of determining the difference between the input image and the reference background image described with reference to FIG. 6 is called the background difference method.

Figure 12A:
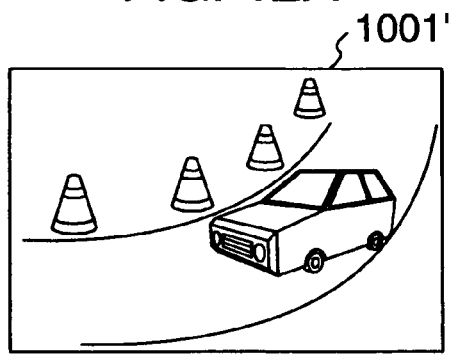
FIGS. 12A to 12E are diagrams for explaining a method of detecting the object position by the inter-frame difference method according to this first embodiment of the invention.
Figure 12B:
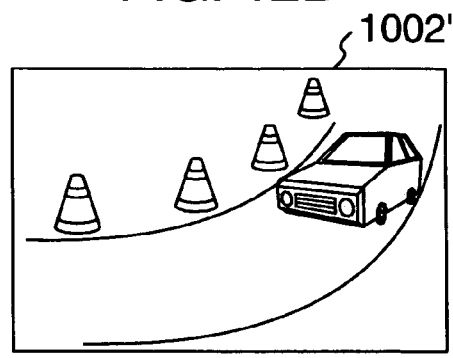
Figure 12C:
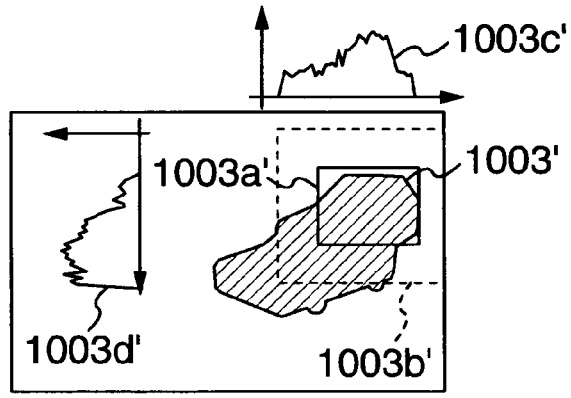

Next, in the maximum difference amount position search step 112, the difference image obtained in the inter-frame difference processing step 110 is searched for an area containing many differences. This processing is explained with reference to FIGS. 12A to 12E. FIG. 12A shows an image 1001 input in the image input step 105, and FIG. 12B an input image 1002 stored in the image memory 402e. The input image 1002 is acquired at a time point different from the input image 1001 by a predetermined length of time (say, one second). Then, a hatched area 1003 in FIG. 12C is obtained as a difference image.

An area expanded from the intruding object position 1003a (at this time point, the position of the intruding object in the preceding processing frame is used as the present position of the intruding object is unknown) along Y and Y directions by a predetermined number d of pixels (say, 100) is set as a search area 1003b. The accumulated value of the pixel difference in this area is projected on X and Y axes. Projected images 1003c and 1003d shown in FIG. 12C are obtained. These images are denoted as hx(x) and hy(y), respectively. In FIG. 12C, the graph projected is shown in superposition on the difference image to facilitate the understanding.

Figure 12D:
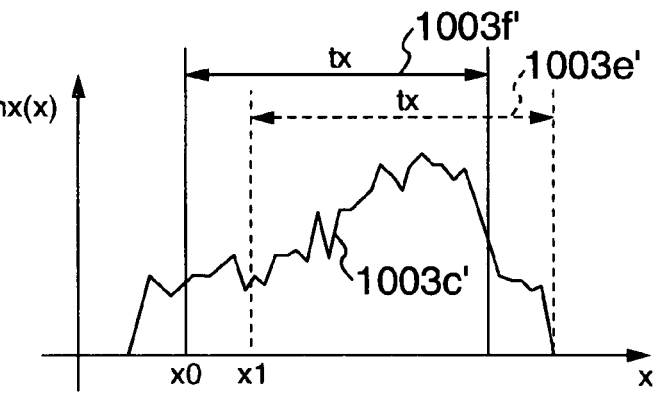
Figure 12E:
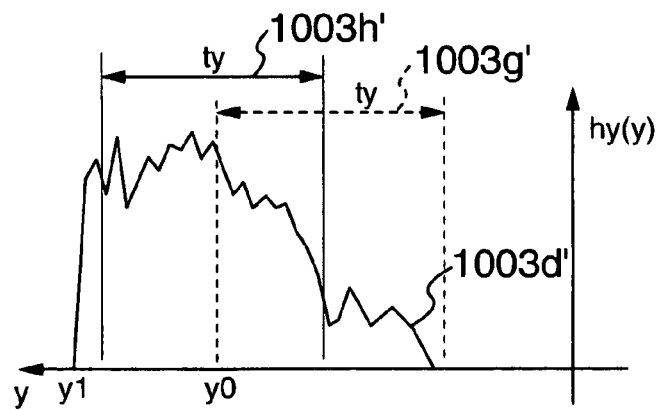

FIG. 12D shows hx(x) representing the projection on the X axis of the accumulated value of the differences of the images in the search area. The area 1003a indicated by dotted line represents a range of the detection position of the intruding object in the preceding processing frame. The range associated with the maximum accumulated value is detected within the width tx of the intruding object (the width of the intruding object detected in the intruding object detection step 102). In this example, the area 1003f defined by solid line is the particular range. This is expressed by the equation below.

$$x_1 = \underset{x_0-d<x_1<x_0+d}{\arg\max} \sum_{i=0}^{t_x-1} h_x(x_1 + i) \quad (1)$$

In equation (1), $x_0$ designates the position of the intruding object (with respect to the coordinate of the upper left point of the rectangle circumscribing the intruding object) detected in the preceding frame, and $x_1$ designates the position associated with the greatest difference within the width tx of the intruding object detected. A moving object exists in the area where the greatest difference is detected. In similar fashion, in the graph shown in FIG. 12E with the difference projected on Y axis, an area 1003h with the greatest difference detected within the height ty of the intruding object (the height of the intruding object detected in the intruding object detection processing step 102) is detected from the area 1003g where the intruding object exists in the preceding processing frame indicated by dotted line.

This is expressed by equation (2) below.

$$y_1 = \underset{y_0-d<y_1<y_0+d}{\arg\max} \sum_{j=0}^{t_y-1} h_y(y_1 + j) \quad (2)$$

In equation (2), $y_0$ designates the position of the intruding object detected in the preceding frame, and $y_1$ the position associated with the greatest difference within the height ty of the intruding object detected.

In the inter-frame difference processing step 110, therefore, the position $(x_1, y_1)$ associated many differences is detected.

Incidentally, according to this embodiment, as shown by equations (1) and (2), the values $x_1$, $y_1$ associated with the largest accumulated value of hx(x), hy(y) are determined in the range of $x_1<x<x_1+dx$, $y_1<y<y_1+dy$ where $x_1$ or $y_1$ is changed in the range $x_0-d<x_1<x_0+d$ or $y_0-d<y_1<y_0+d$, respectively. As an alternative, in the case where $$\sum_{i=0}^{dx} hx(x_1 + i), \sum_{i=0}^{dy} hy(y_1 + i)$$

in equations (1) and (2) exceed a predetermined threshold value while $x_1$ and $y_1$ change in the range of $x_0-d<x_1<x_0+d$, $y_0-d<y_1<y_0+d$, the calculation of equations (1) and (2) is stopped, and the prevailing $x_1$ or $y_1$ may be used as the corrected position of the template. In this case, the predetermined threshold value is set to 30% of the maximum accumulated value 255×(dy+2d) (255×(dx+2d) for y axis), for example. The range detected by this value represents a portion including the difference of not less than 30% of the maximum accumulated value of the difference, thereby making it possible to reduce the amount of calculation of equations (1) and (2).

According to the above-described method, the difference obtained by the inter-frame difference processing is projected on the X and Y axes, then the area having the maximum difference is obtained based on the differences thus projected, and the position of the intruding object is corrected Instead of this method, another method may be employed in which an area of a template size within the search range is scanned from the uppermost left side to the lowest right side, for example, within the camera view field and a portion where the total amount of the difference contained within the template size area becomes maximum is detected thereby to correct the position thus detected as a new position of the intruding object. This method may be modified in a manner that the scanning within the search range is stopped when the total amount of the difference within the template size area becomes equal to or larger than a predetermined value thereby to correct the area thus detected as a new position of the intruding object.

Next, in the difference amount determining step 201, the total value of the differences in the area $(x_1, y_1)-(x_1+tx,$ $y_1+ty$) containing a large difference is determined. In the case where this value is less than $tx \times ty \times th \times 0.1$, the difference amount is small, i.e. the object moving in the detected area is determined not as an intruding object, and the process branches to the intruding object detection processing step 102. In the case where the value is not less than $tx \times ty \times th \times 0.1$, on the other hand, the difference amount is large, i.e. the object moving in the detected area is determined as an intruding object, and the process branches to the intruding object position correcting step 115. The value 0.1, for example, is to determine whether the difference corresponding to ten percent, for example, of the threshold value is included or not in the detected area. The value 0.1 (ten percent) is an example after all, and the ratio can be set arbitrarily in accordance with the actual setting of the system.

In the intruding object position correcting step 115, the detected position $(x_1, y_1)$ is replaced by the position $(x_0, y_0)$ where the intruding object exists.

Only in the case where it is determined in the universal head stop determining step 109 that the camera universal head 401c is stopped, the intruding object position correcting step 115 is executed from the inter-frame difference processing step 110. This is due to the fact that the inter-frame difference method is executed by comparing the input images of two frames obtained at different time points, and therefore the inter-frame difference processing cannot be executed while the camera universal head 401c is moving.

Next, in the camera universal head control step 118, the universal head of the camera is controlled in the same manner as the conventional camera universal head control method explained above with reference to FIGS. 5 and 6. Further in the second alarm/alarm display step 119, the image of an intruding object being tracked is displayed on the image monitor 405 or the alarm lamp 406 is turned on thereby to inform that the intruding object is being tracked in the monitor area.

Specifically, according to the embodiment shown in FIG. 2, the problem can be solved that in the case where an intruding object in motion exists in the detected area and the template matching is continued using a template containing many images other than the intruding object to be tracked, by the intruding object tracking method using the template matching, the intruding object could not be grasped but the background portion included in the template is matched, so that the tracking of the intruding object to be tracked cannot be guaranteed and the steady tracking is made impossible. In this way, the intruding object in motion can be positively tracked. As a result, the performance of the intruding object tracking process is improved to facilitate the construction of a highly reliable monitor system.

Figure 3:
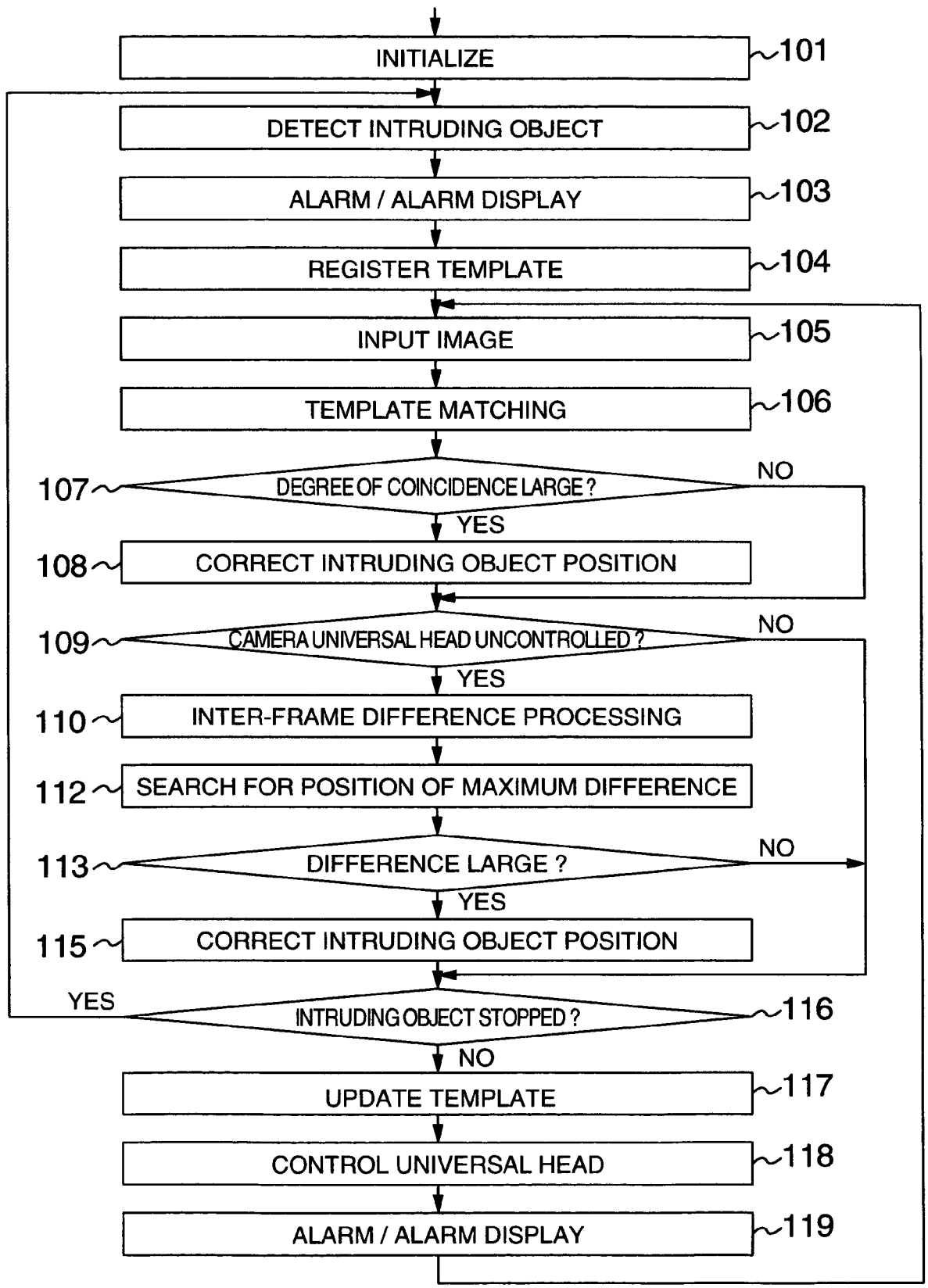
FIG. 3 is a flowchart for explaining an example of the processing flow according to a second embodiment of the invention.

The operation according to the second embodiment of the invention is explained with reference to FIG. 3. FIG. 3 is a flowchart showing an example of the processing in the second embodiment of the invention.

Figure 5:
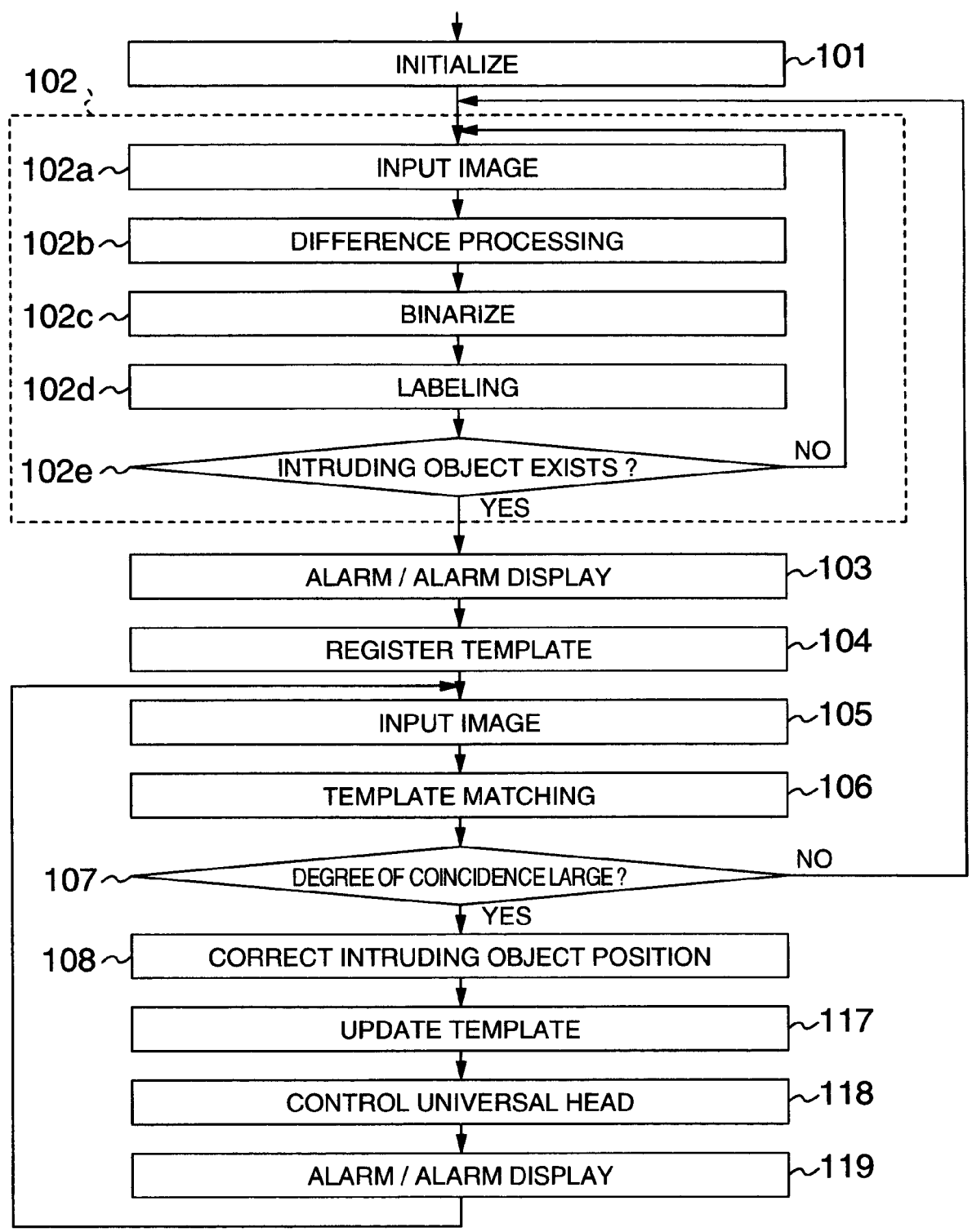
FIG. 5 is a flowchart for explaining the processing flow according to the conventional object tracking method.

The processing shown in FIG. 3 is a combination of the processing of FIG. 2 and the conventional intruding object tracking method using the template matching shown in FIG. 5. In this combined processing, the steps other than the difference amount determining step 113 and the intruding object stop determining step 116 are already explained and therefore not explained below. Since the maximum difference amount position search step 112 in this embodiment is slightly different from that of the first embodiment shown in FIG. 2, the maximum difference amount position search step 112 in this embodiment will be explained later with reference to FIGS. 8A to 8E.

In this process, the position of the intruding object is detected by template matching through the process from the template matching step 106 to the first intruding object position correcting step 108. In view of the likelihood of the detected intruding object position being displaced from the template position as in the prior art, however, the intruding object is corrected to the right position through the following process of the camera universal head stop determining step 109 to the second intruding object position correcting step 115.

In the difference amount determining step 201 according to the first embodiment, the tracking of an intruding object is stopped in the case where the detected position difference amount is not more than a predetermined value, and the process returns to the intruding object detection processing step 102 again. In the difference amount determining step 113 according to the third embodiment shown in FIG. 3, however, the tracking of the intruding object is continued even in the case where the difference amount is not more than a predetermined value.

In the case where the difference amount is not more than a predetermined value, however, the position of the intruding object is not corrected and the process branches to the intruding object stop determining step 116.

From the intruding object stop determining step 116, the process branches to the intruding object detection processing step 102 in the case where the detected position of the intruding object remains unchanged for a predetermined length of time (say, ten seconds), while the process branches to the template update step 117 in the case where the detected position of the intruding object is found to have changed.

According to the first embodiment of the invention described above, the position of the intruding object is detected using only the inter-frame difference method. In the inter-frame difference method, however, the difference ceases to appear in the case where the motion of the intruding object stops, in which case the tracking of the intruding object is immediately stopped and a new intruding object is looked for. According to the second embodiment of the invention, on the other hand, the tracking of the intruding object can be continued using the template matching before the lapse of a predetermined time (say, ten seconds in the aforementioned case) even after the motion of the intruding object stops.

Figure 7:
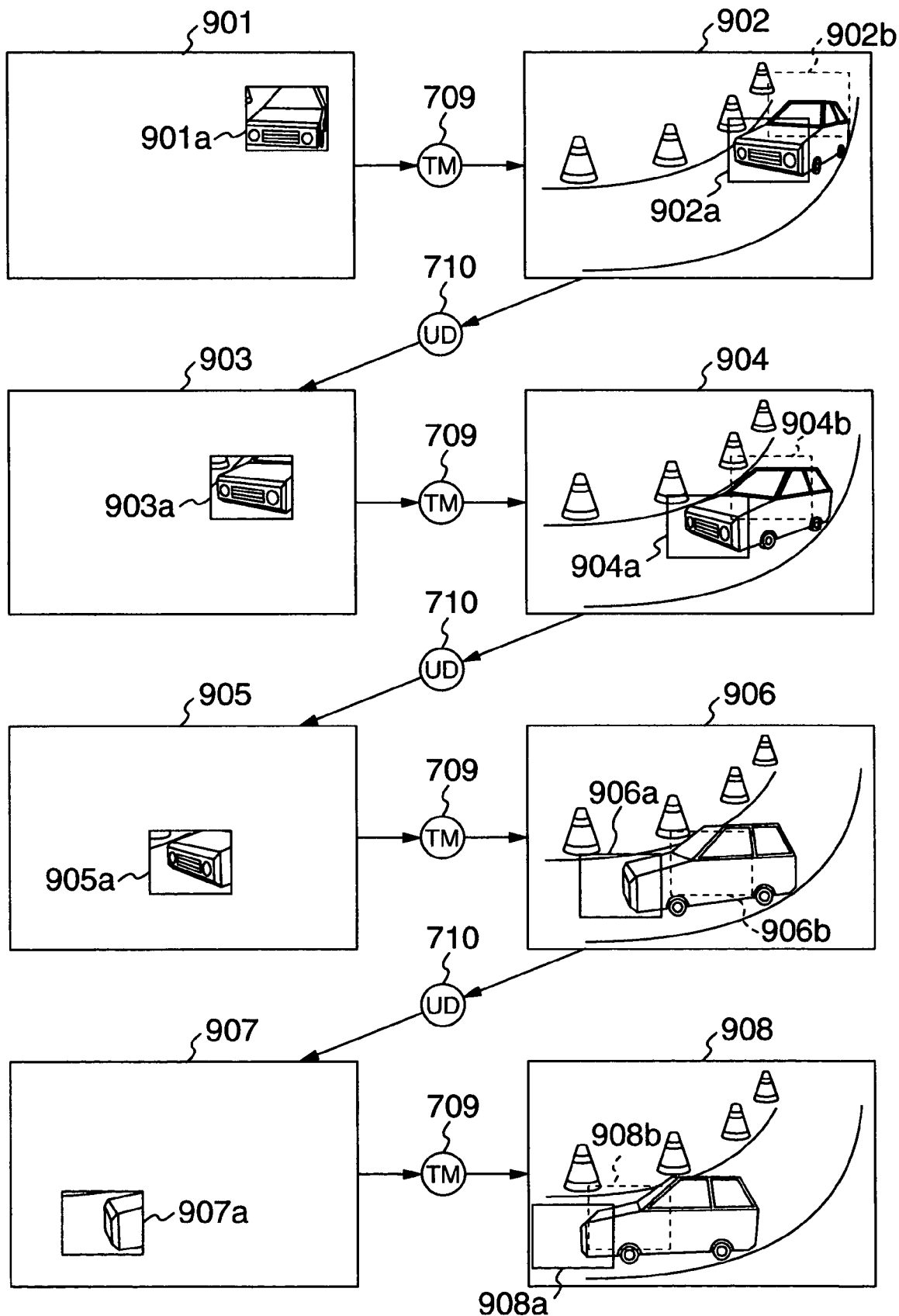
FIG. 7 is a diagram for explaining the problems of the conventional object tracking method.
Figure 9:
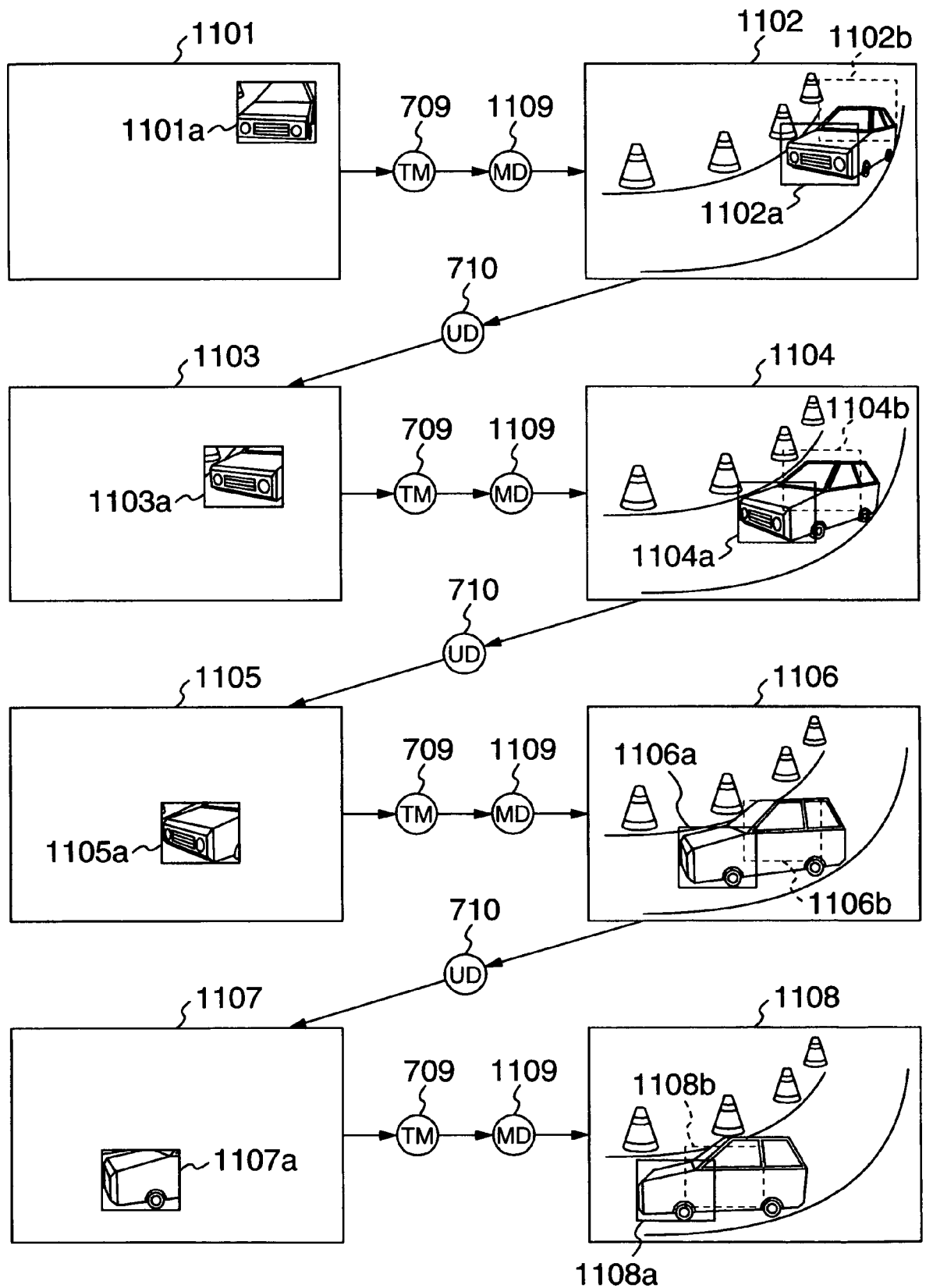
FIG. 9 is a diagram for explaining an example of the processing flow in an object tracking method according to the second embodiment of the invention.

The flow of this processing is explained with reference to FIG. 9. FIG. 9 is a diagram showing an example of the process executed according to the second embodiment of the invention and represents a case in which a vehicle running along a curved vehicle lane in the imaging field of view shown in FIG. 7 is tracked as an intruding object.

FIG. 9 shows a case where the camera universal head is not controlled in order to explain the effects of the inter-frame difference processing step 110 and the maximum difference amount position search step 112. The operation timings of the camera universal head control processing and the inter-frame difference processing will be explained later.

Numerals 1101, 1103, 1105 and 1107 designate the template image at time points $t_1-1, t_1, t_1+1$ and $t_1+2$, respectively, and numerals 1101a, 1103a, 1105a and 1107a the template at time points $t_1-1, t_1, t_1+1$ and $t_1+2$, respectively. Also, numerals 1102, 1104, 1106 and 1108 designate input images at time points $t_1, t_1+1$ and $t_1+2$ and $t_1+3$, respectively, numerals 1102b, 1104b, 1106b and 1108b the template position at time points $t_1-1, t_1, t_1+1$ and $t_1+2$, respectively (the position of the intruding object at time points $t_1-1, t_1, t_1+1$ and $t_1+2$, respectively), and numerals 1102a, 1104a, 1106a and 1108a the position of the intruding object detected by template matching at time points $t_1, t_1+1$ and $t_1+2$ and $t_1+3$, respectively.

In FIG. 9, the template 1101a registered at time point $t_1-1$ is an image of the vehicle with the front portion thereof facing substantially forward. At time point $t_1$, the template matching is conducted using the template 1101a (template matching step 709) to detect the moved position of the intruding object. At the same time, the position of the intruding object is accurately corrected by the inter-frame difference method (the inter-frame difference processing step 110 to the intruding object correcting step 115). Further, the template 1101a is updated to the template 1103a (template update processing step 710).

Then, the template 110a is updated to the template 1105a at time point $t_1+1$, and to the template 1107a at time point $t_1+2$. This process is repeated up to time point $t_1+3$. Thus, the template held the front portion with the head lamps of the vehicle at the tracking start time point $t_1$. At time point $t_1+3$, however, the template is displaced to the left side of the vehicle according to the prior art shown in FIG. 7 (template 907a). According to the second embodiment of the invention, in contrast, the template accurately holds the intruding object (template 1107a).

Even in the case where the intruding object changes in direction as shown in FIG. 9, therefore, the displacement between the intruding object and the template which occurs with the direction change of the intruding object in the conventional template matching method is obviated, and the intruding object can be tracked accurately.

According to this embodiment, the position (range) of the intruding object is specified by the template matching step 106, then the search range is set based on this specified range, and the inter-frame difference processing and the maximum difference amount position search processing are performed using the search range. As compared with the range according to the first embodiment of the invention (d=100 in the aforementioned example), therefore, the range can be reduced to d=50 pixels, for example, and therefore the calculation amount in the inter-frame difference method can be reduced.

Figure 8A:
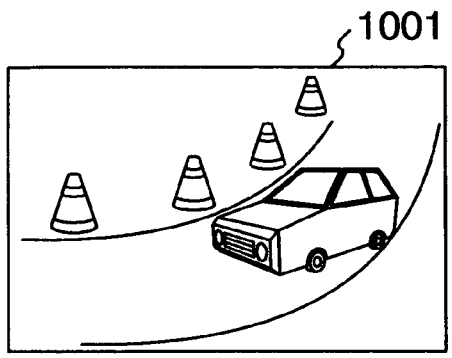
FIGS. 8A to 8E are diagrams for explaining a method of detecting the object position by the inter-frame difference method according to this second embodiment of the invention.
Figure 8B:
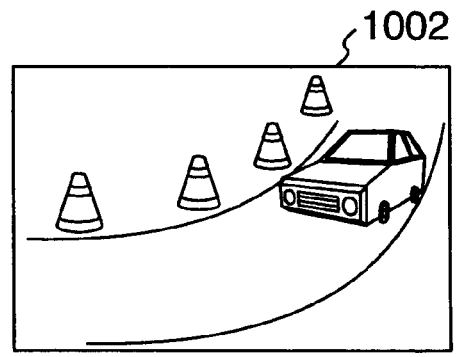
Figure 8C:
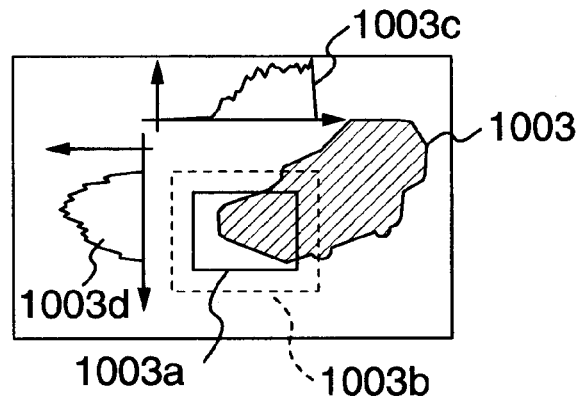
Figure 8D:
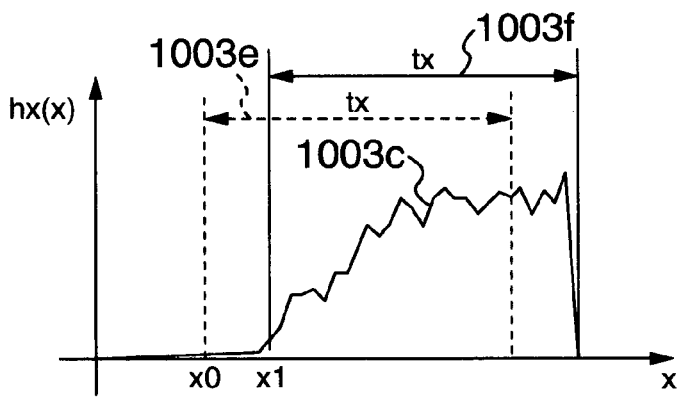
Figure 8E:
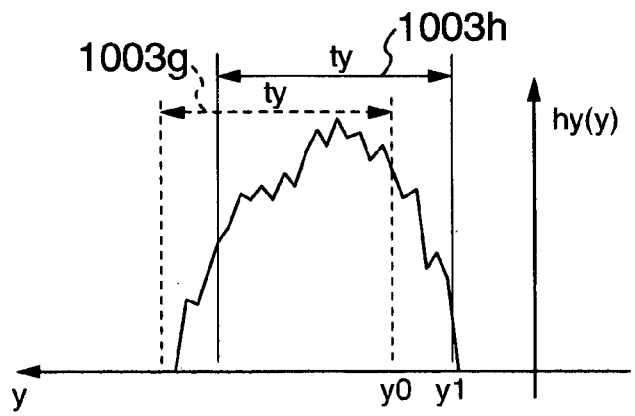

The processing of the maximum difference amount position search step 112 in the second embodiment will be shown in FIGS. 8A to 8E. In these figures, the explanation of like portions as those of FIGS. 12A to 12E will be omitted. As shown in FIG. 8C, an area which is made larger by a predetermined number of pixels d, for example, 50 pixels in each of the X and Y axes with respect to the intruding object position 1003a is set as a search area 1003b.

Figure 11A:
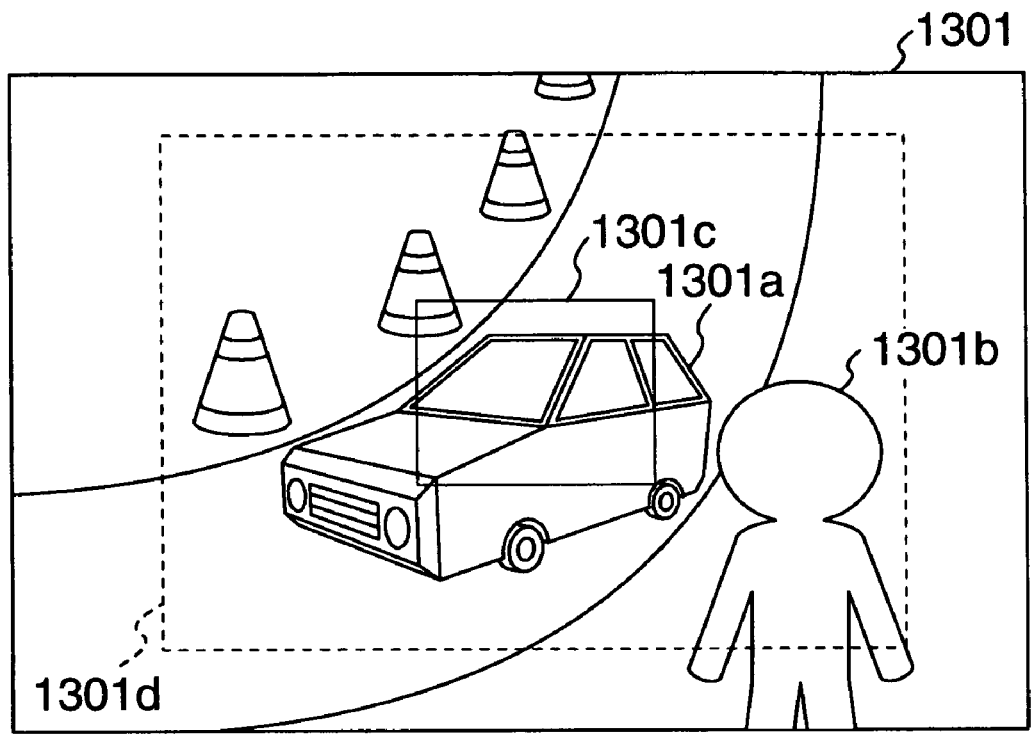
FIGS. 11A and 11B are diagrams for explaining the effects of the second embodiment of the invention.

Further, according to the second embodiment, an intruding object can be tracked more accurately than in the first embodiment in the case where a plurality of objects exist in the imaging view field of the TV camera. This advantage is explained with reference to FIGS. 11A and 11B. FIG. 11A shows an example in which another object 1301b appears before the vehicle 1301a tracked in the imaging view field. The object 1301b which is located before the vehicle 1301a has a size and a speed apparently larger than the vehicle 1301a. In this case, the difference obtained by the inter-frame difference processing is larger for the object 1301b. Assume that the detection position of the intruding object in the preceding frame is indicated by the range of 1301c. According to the first embodiment of the invention, the range of processing the inter-frame difference is indicated by 1301d. The object 1301b is displayed in the range 1301d. In the case where the maximum difference position search step 112 is executed under this condition, the range in which the resulting accumulated difference value is maximum is represented by the object 1301b.

Figure 11B:
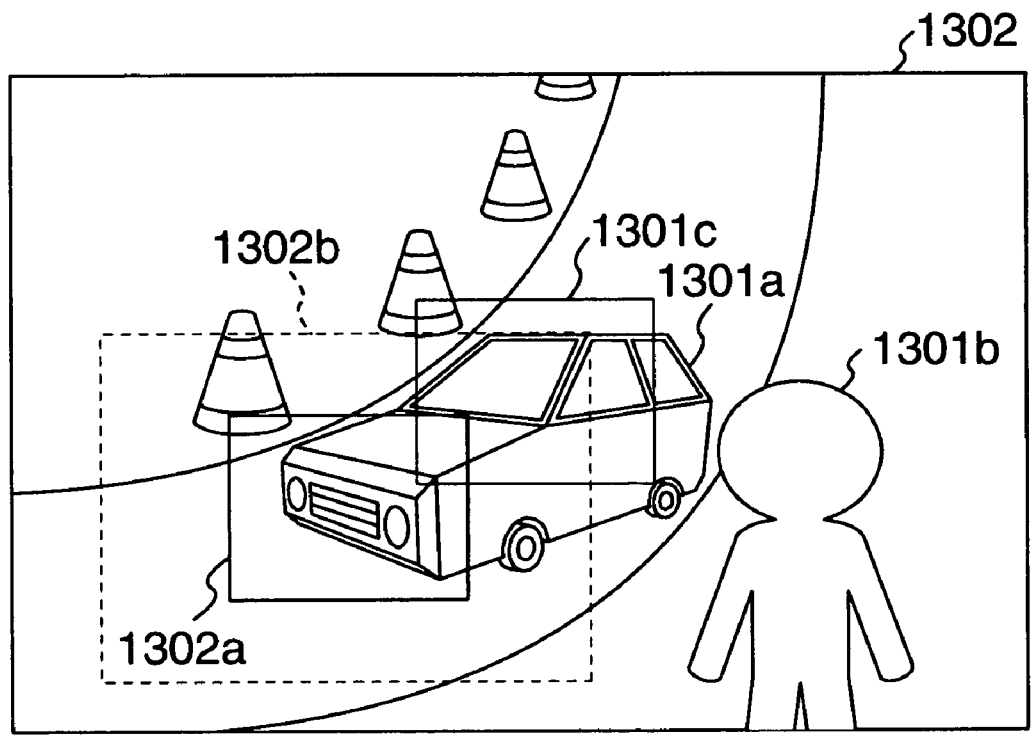

According to the second embodiment, in contrast, as shown in FIG. 11B, the range 1302a where the intruding object exists is roughly detected in the template matching step 106, so that the range 1302b where the inter-frame difference is processed is determined based on the range 1302a. In the case under consideration, the object 1301b is not displayed in the range 1302b, and even in the case where the maximum difference position search step 112 is executed, the range of the maximum accumulated difference value is not represented by the object 1301b unlike in the first embodiment, thereby making it possible to grasp the vehicle 1301a accurately.

As a result, the performance of the intruding object tracking process is improved and a reliable monitor system is easily constructed.

FIGS. 13A to 13C are timing charts showing the operations of the template matching processing, the camera universal head control processing and the intruding object position correcting processing using the inter-frame difference processing. FIGS. 13A to 13C are diagrams showing the operations of the respective processings during a time period from a time point t0 to a time point t0+12. In the figures, a reference numeral 1401 depicts an axis representing the flow of the time points, in which the time points t0, t0+1, - - - are marked sequentially in accordance with the processing cycles of the template matching processing. A reference numeral 1402 of FIG. 13A depicts the operation of the template matching processing, wherein each of time zones (for example, 1402a, 1402b, - - - ) shown by hatched areas represents a time period during which the processing of the template matching step 106 is actually performed.

A reference numeral 1403 of FIG. 13B depicts the operation of the camera universal head control step 118, wherein each of time zones shown by hatched areas represents a time period during which the camera universal head is actually controlled. The time zones during which the camera universal head is actually controlled will be explained sequentially. If, in the processing frame at the time point t0, the detected position of the intruding object is deviated from almost the center portion of the camera view field, the control operation of the camera universal head is started at the camera universal head control step 118. When, in the processing frame at the time point t0+1, the detected position of the intruding object is held almost at the center portion of the camera view field, the control operation of the camera universal head is stopped at the camera universal head control step 118. That is, the control time period of the camera universal head is shown by a time period 1403a. Similarly, when, in each of the processing frames at the time points t0+3, t0+4 and t0+5, the detected position of the intruding object is deviated from almost the center portion of the camera view field and then the detected position of the intruding object is held almost at the center portion of the camera view field in the processing frame at the time point t0+6, the camera universal head is controlled during a time period 1403b. Further, when, in each of the processing frames at the time points t0+9 and t0+10, the detected position of the intruding object is deviated from almost the center portion of the camera view field and then the position of the intruding object detected in the processing frame at the time point t0+11 is held almost at the center portion of the camera view field, the camera universal head is controlled during a time period 1403c.

A reference numeral 1404 of FIG. 13C depicts the operation of the intruding object position correction processing (steps 110 to 115) based on the difference obtained in the inter-frame difference processing step 110, wherein each of time zones shown by hatched areas represents a time period during which the inter-frame difference processing step 110 etc. are executed. As described above, in the processing frame at the time point t0+1, since the detected position of the intruding object is held almost at the center portion of the camera view field, the control operation of the camera universal head is stopped at the end point of the time period 1403*a*. Then, at the processing frame of the next time point t0+2, since it is determined that the control operation of the camera universal head is stopped at the camera universal head stop determining step 109, the inter-frame difference processing is executed. That is, during the time period 1404*a*, the inter-frame difference processing step 110 is executed thereby to correct the position of the intruding object (steps 112 to 115). At the time period 1404*b* of the processing frame of the succeeding time point t0+3, although the inter-frame difference processing is also executed, the position of the intruding object detected at the processing frame of the time point t0+3 is deviated from almost the center portion of the camera view field. Thus, the inter-frame difference processing is not executed in the processing frame of the succeeding time point t0+4. Similarly, in the processing frame at the time point t0+6 where the detected position of the intruding object is held almost at the center portion of the camera view field, the control operation of the camera universal head is stopped (a time period 1403*b*). Then, the inter-frame difference processing step 110 etc. are executed in the processing frames of time points t0+7, t0+8 and t0+9 until the control operation of the camera universal head is started again, that is, during time periods 1404*c*, 1404*d* and 1404*e*, whereby the position of the intruding object is corrected. In other words, the intruding object position correction processing using the inter-frame difference processing is executed at the timing where the control operation of the camera universal head is not performed.

Figure 1A:
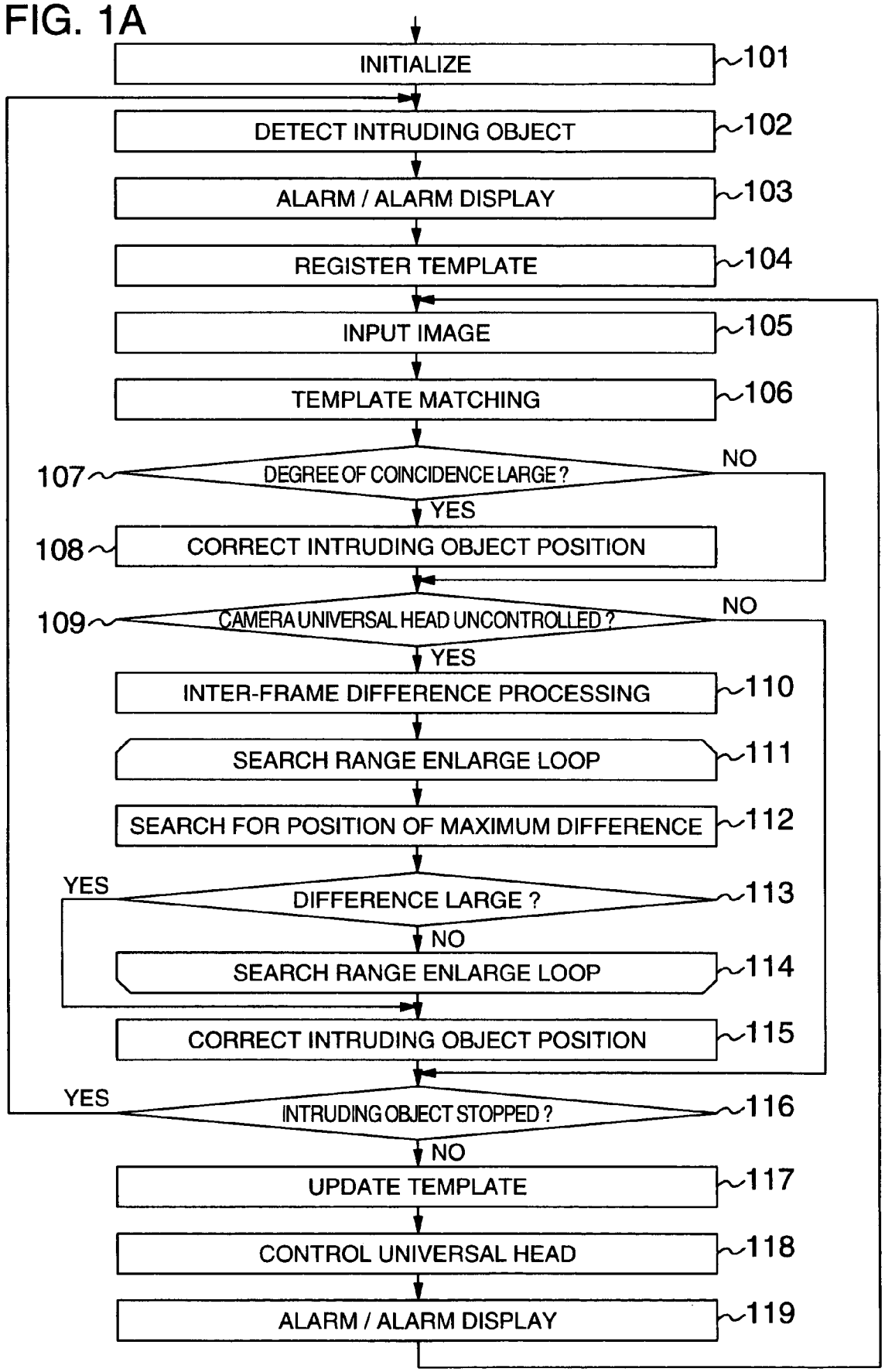
FIGS. 1A and 1B are flowcharts for explaining an example of the processing flow according to a third embodiment of the invention.
Figure 1B:
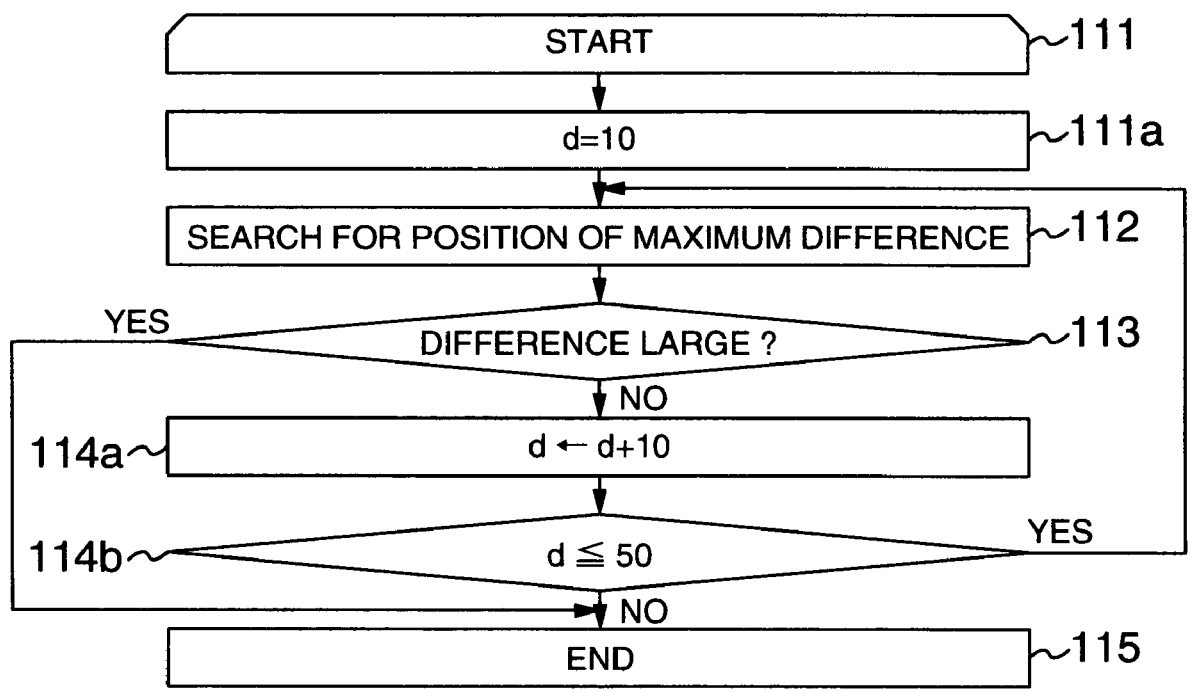

The operation of the third embodiment of the invention is explained with reference to FIGS. 1A and 1B. FIGS. 1A and 1B are flowcharts showing an example of the processing according to the third-embodiment of the invention. The processing shown in FIG. 1A is equivalent to the process of FIG. 3 with the search range enlarging loop (steps 111 to 114) added thereto. The other processing steps have already been explained and are not explained again.

FIG. 1B is a flowchart showing the detail of the search range enlarging process (steps 112 to 114).

The search range enlarging loop (steps 111 to 114) is such that the search area 1003*b* providing the projection range of the difference image due to the inter-frame difference shown in FIG. 8C is enlarged in steps (in five steps in this case). According to this embodiment, the search range enlarging process (steps 111 to 114) is repeated a plurality of times or, say, five times for each processing frame. In the second embodiment described above, the process is executed with the search range d as 50. According to this embodiment, on the other hand, the initial value of the search range d is set to 10 (step 111*a*) in the first execution of the search range enlarging process including the search steps 111 to 114. Then, in the second search range enlarging process in step 114*a*, d+10 is set as a new value d (d=20). Similarly, in the third search range enlarging process, the value d is updated to 30 in step 114*a*, and then to 50 in the fifth search range enlarging process. In this way, the search range can be enlarged in steps. The search range enlarging process is prevented by step 114 not to exceed five times. Steps 114*a* and 114*b* correspond to step 114 in FIG. 1A.

In the case where the difference of more than a predetermined value is detected in the difference amount determining step 113 during the five sessions of executing steps 111 to 114, the repetition of the search range enlarging process is suspended and the intruding object position correcting step 115 is executed.

According to the second embodiment, in the case where a plurality of objects are moving in the intruding object search range, an intruding object is considered to exist in the portion of the largest difference (as determined in the difference amount determining step 113), and the position of the intruding object is determined unconditionally. With the processing according to the third embodiment, on the other hand, a place near the position of the intruding object detected by template matching where the difference is large is determined as the position of the intruding object. Even in the case where a plurality of moving objects exist in the intruding object search range, therefore, the position of the intruding object can be correctly detected. This effect is explained with reference to FIG. 10.

Figure 10:
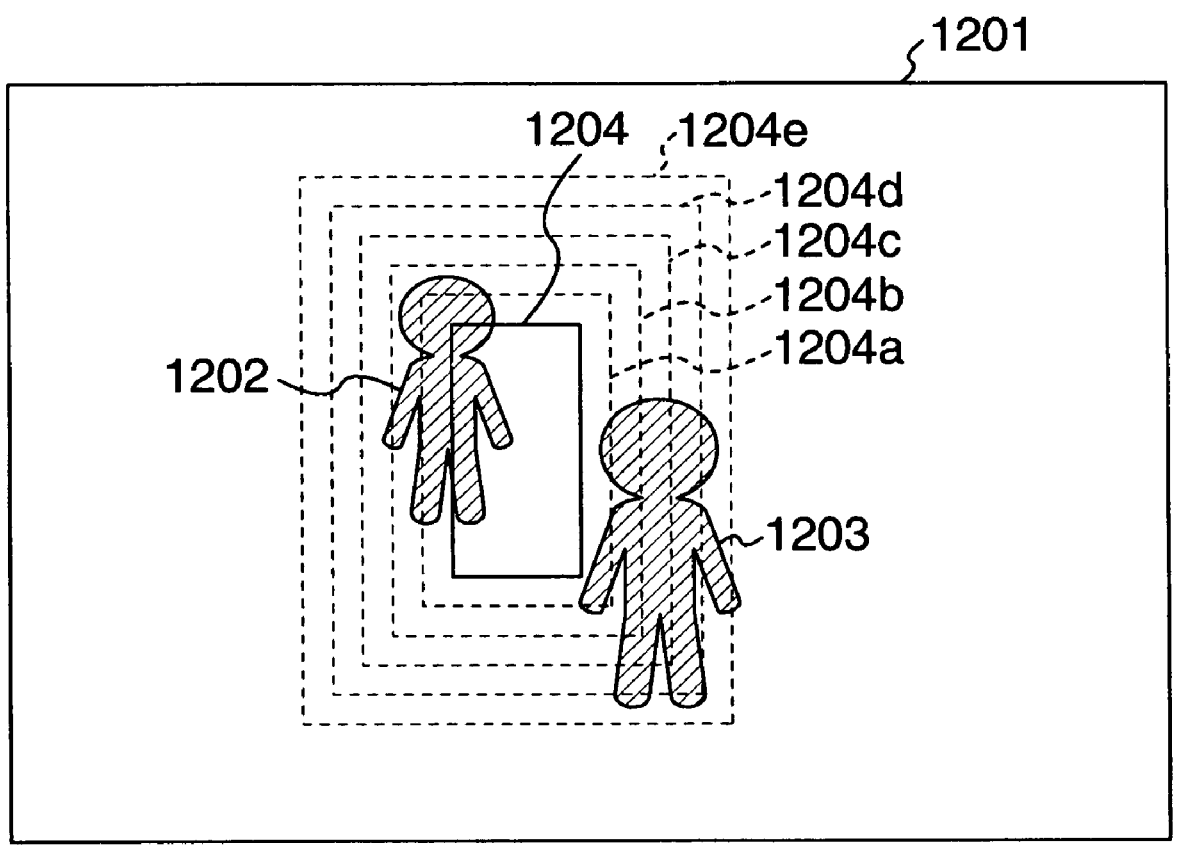
FIG. 10 is a diagram for explaining a method of detecting the object position according to the third embodiment of the invention.

FIG. 10 is a diagram for explaining a method of detecting the position of an intruding object according to the third embodiment of the invention, and shows a difference image 1201 based on the inter-frame difference at a given time point. FIG. 10 shows an image displayed the moment an object 1203 comes to appear in the monitor view field while the intruding object 1202 is being tracked. A rectangle 1204 indicates the position of the intruding object detected in the template matching step 106. Also, rectangles 1204*a*, 1204*b*, 1204*c*, 1204*d* and 1204*e* indicate the search range in each step of enlarging the search range.

In the second embodiment of the invention, the portion of the largest difference is detected in the range of the rectangle 1204*e*. In the intruding object position correcting step 115, therefore, the position is corrected to a different object 1203 having a larger difference amount, but not to the intruding object being tracked. Thus, the different object 1203, not the intruding object 1202 to be tracked, is tracked in error. According to the third embodiment of the invention, in contrast, the intruding object 1202 can be grasped in a search range 1204*b* enlarged for the second time, for example, from the intruding object position 1204 detected by the template matching process. Specifically, since the difference fails to reach a predetermined value in the first search range 1204*a*, the search is conducted again in the next enlarged search range 1204*b*. The difference reach the predetermined value in this search range 1204*b*, and therefore the position of the particular object 1202 can be correctly detected and corrected.

According to this embodiment, the number d of pixels along X and Y axes indicating the search range is set to 10 (d=10) for the first search and 20 (d=20) for the second search. In this way, the number of pixels representing the search range is increased in steps. Nevertheless, the method of setting the search range is not limited. As another method of setting the search range, the size of the search range is fixed to the template size, and with respect to the position 1204 detected in the template matching step 106, the search is conducted in the search range moved by 10 pixels upward, for example, followed by conducting the search in the search range moved upward by 10 pixels and leftward by 10 pixels, followed by conducting the search in the search range moved leftward by 10 pixels, followed by conducting the search in the search range moved downward by 10 pixels and leftward by 10 pixels, followed by conducting the search in the search range moved downward by 10 pixels, followed by conducting the search in the search range moved downward by 10 pixels and rightward by 10 pixels, followed by conducting the search in the search range moved rightward by 10 pixels, followed by conducting the search in the search range moved upward by 10 pixels and rightward by 10 pixels, followed by conducting the search in the search range moved upward by 20 pixels, followed by conducting the search in the search range moved upward by 20 pixels and leftward by 20 pixels, followed by conducting the search in the search range moved leftward by 20 pixels, and so on. In this way, the search is conducted while moving the search range spirally to detect a range associated with the maximum accumulated value of the difference or a range associated with accumulated value of the difference equal to or larger than a predetermined value.

Even in the case where a plurality of objects exist in a given intruding object search range, therefore, the correct position of an intruding object can be detected. As a result, the performance of the intruding object tracking process is improved, and a reliable monitor system is constructed.

Although the embodiments have been explained as to the case where an intruding object is detected and tracked, an object to be detected is not limited to an intruding object but may be any moving member other than an intruding object. Further, although the embodiments have been explained as to the case where the invention is applied to a monitor system, the invention may be applied to a system for merely detecting and tracking a moving member without aiding the monitoring of the member. In this case, effects similar to that of the aforesaid embodiments can be obtained.

Further, in the present invention, the search range enlarging process of the third embodiment may be applied to the first embodiment.

This invention obviates the problem of the prior art that in the case where an intruding object changes in direction, the template may be displaced from the intruding object and come to contain many images other than the intruding object to be tracked, thereby making it impossible to hold the intruding object with the template matching the background portion undesirably. Further, according to this invention, even an intruding object changing considerably in direction can be detected and tracked. As a result, an intruding object tracking method and an intruding object tracking apparatus are provided which are high in reliability and stable in operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An object tracking method for detecting and tracking a moving object in a picked-up image based on an image signal acquired by an imaging unit, comprising the steps of:
   a) producing a template image cut out from the image acquired from said imaging unit so as to include a part of said object;
   b) conducting a template matching by calculating correlations between a present image from said imaging unit and said template image, detecting a position of a part of said present image matched with said template image, and updating a position of a current template image by said detected position;
   c) detecting an image changing area between at least two frames of images picked up at different time points by said imaging unit;
   d) correcting said detected position of said object to a new position in which said image changing area is detected in a manner different from the detecting of a position of the part of said present image matched with said template image according to said template matching of said step b; and
   e) updating a template image by an image output as a new template image based on the updated position of said object, wherein said step b to said step e are repeatedly executed while tracking the object.

2. An object tracking method according to claim 1, wherein in said step c said image changing area is detected as an area having a greatest amount or an amount equal to or larger than a predetermined amount in accumulated value of a pixel different in the area.

3. An object tracking method according to claim 1, wherein said step c includes a sub-step of setting a search area for detecting image changing area near the position of said current template image.

4. An object tracking method according to claim 3, wherein said step d) includes a sub-step of enlarging or moving said set search area stepwise.

5. An object tracking apparatus for detecting and tracking a moving object in a picked-up image based on an image signal acquired by an imaging unit, comprising:
   an image input unit which produces a template image cut out from the image acquired from said imaging unit so as to include a part of said object; and
   a processing unit which conducts a template matching by calculating correlations between a present image from said image input unit and said template image, detects a position of a part of said present image matched with said template image, and updates a position of a current template image by said detected position,
   wherein said processing unit further detects an image changing area between at least two frames of images picked up at different time points by said imaging unit, corrects said detected position of said object to a new position in which said image changing area is detected in a manner different from the detection of a position of the part of said present image matched with said template image, and updates a template image by an image output as a new template image based on the updated position of said object, and
   wherein said processing unit repeatedly executes the template matching, detecting said position of said part, detecting said image changing area, correcting said detected position and updating said template image processings while tracking the object.

6. An object tracking apparatus according to claim 5, wherein said processing unit in said detecting said image changing area processing, said image changing area is detected as an area having a greatest amount or an amount equal to or larger than a predetermined amount in accumulated value of a pixel different in the area.

7. An object tracking apparatus according to claim 5, wherein said processing unit sets a search area for detecting the image changing area near the position of said current template image.

8. An object tracking apparatus according to claim 7, wherein said processing unit enlarges or moves said set search area stepwise.

9. An object tracking method according to claim 3, wherein said search area is enlarged within predetermined pixels until any amount equal to or large than said predetermined amount is detected.

10. An object tracking method according to claim 3, wherein said new position is a position of an area having a same size as a size of said template image cut out in said step a.

11. An object tracking method according to claim 3, wherein said step d includes sub-steps of:

calculating inline-accumulated values of pixel differences projected on X or Y axis within said search area; and calculating a sum of said inline-accumulated values over a range of width or height of said image changing area to be detected.

12. An object tracking apparatus according to claim 5, wherein said search area is enlarged within predetermined pixels until any amount equal to or large than said predetermined amount is detected.

13. An object tracking apparatus according to claim 5, wherein said new position is a position of an area having a same size as a size of said template image cut out.

14. An object tracking apparatus according to claim 5, wherein said correcting said detected position processing performed by said processing units includes sub-steps of:

calculating inline-accumulated values of pixel differences projected on X or Y axis within said search area; and calculating a sum of said inline-accumulated values over a range of width or height of said image changing area to be detected.

* * * * *